May 10, 1927.

I. STANLEY 1,628,074

APPARATUS FOR MAKING RECEPTACLES

Filed Oct. 8, 1925

INVENTOR
I. Stanley
BY John O. Seifert
ATTORNEY

May 10, 1927. 1,628,074
I. STANLEY
APPARATUS FOR MAKING RECEPTACLES
Filed Oct. 8, 1925 12 Sheets-Sheet 2
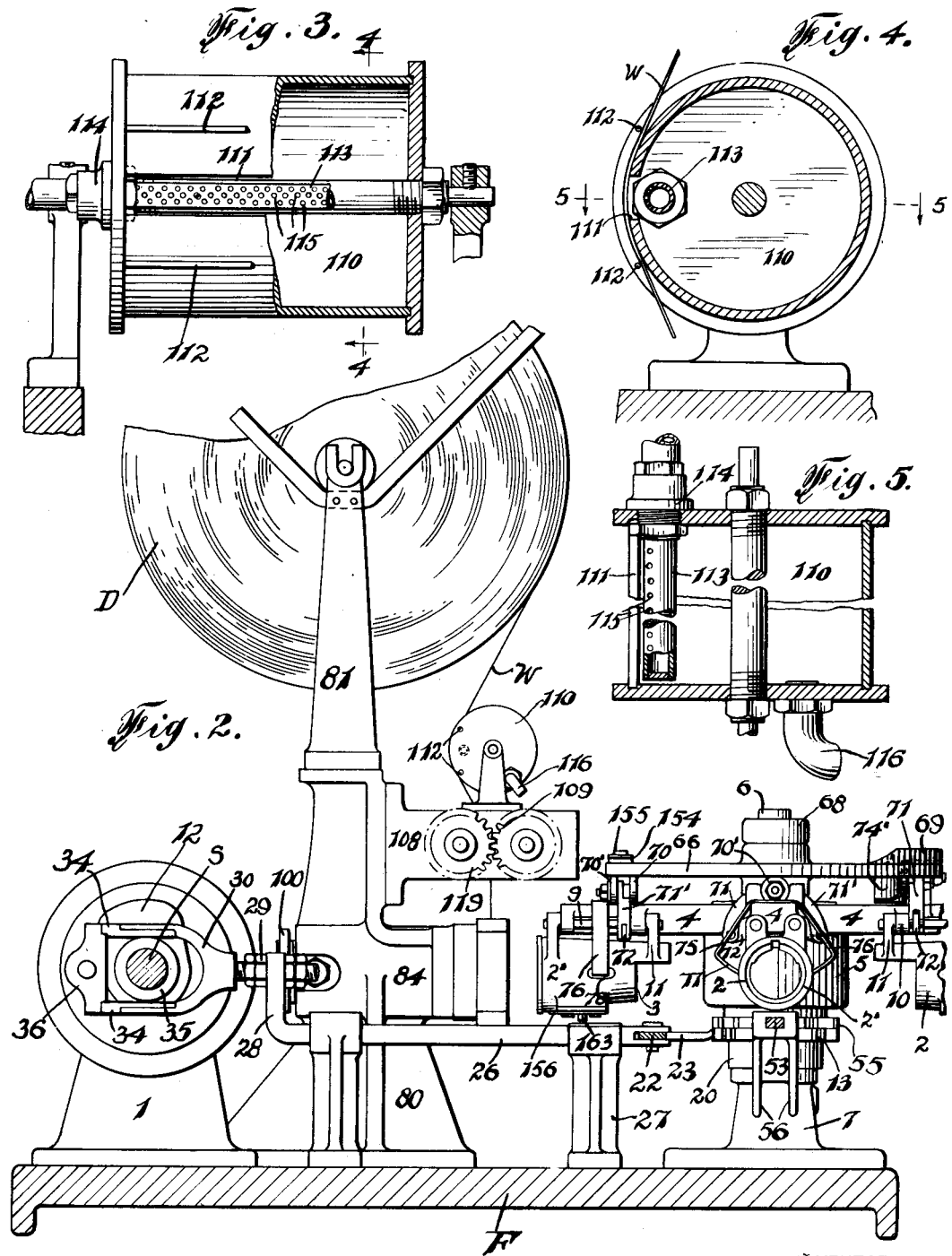
INVENTOR
I. Stanley
BY
ATTORNEY

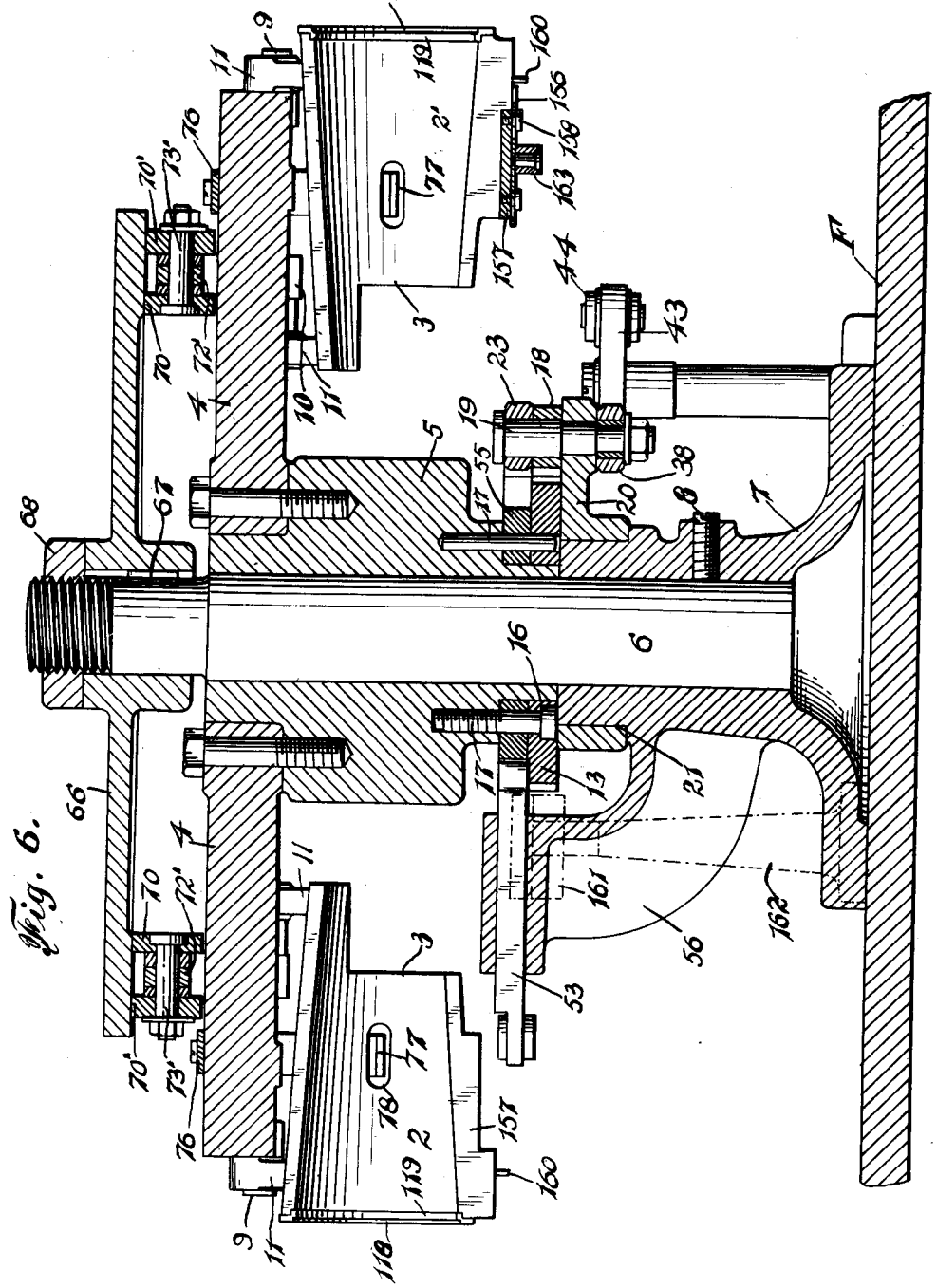

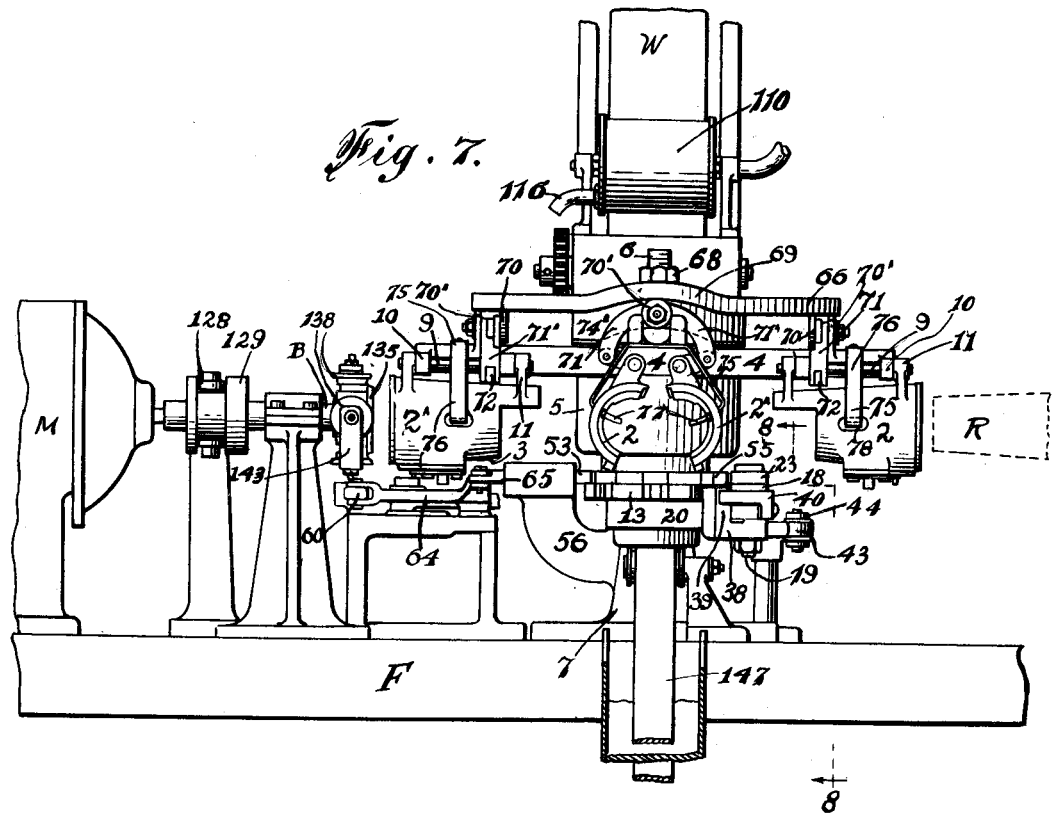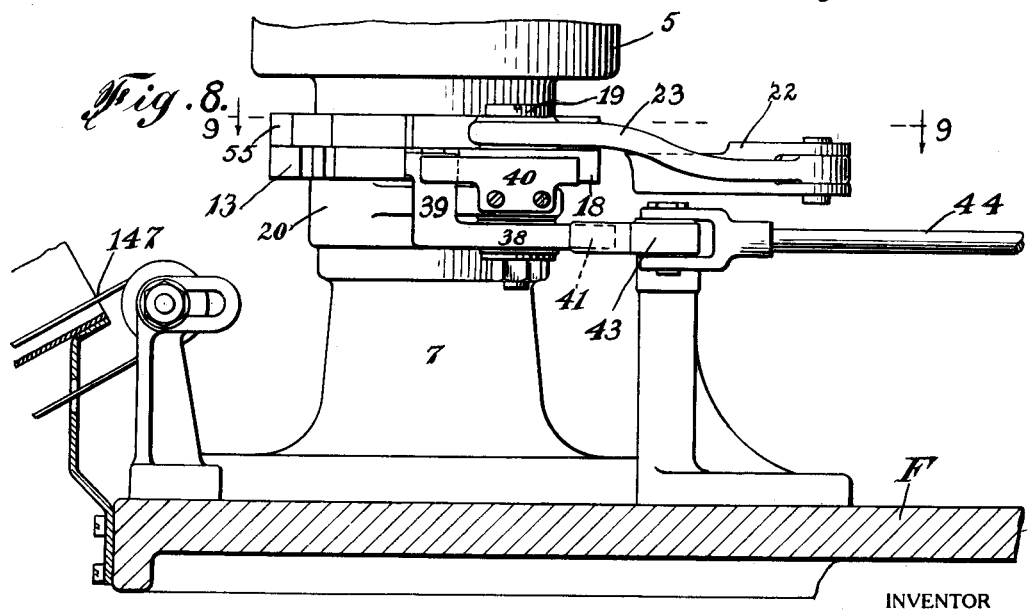

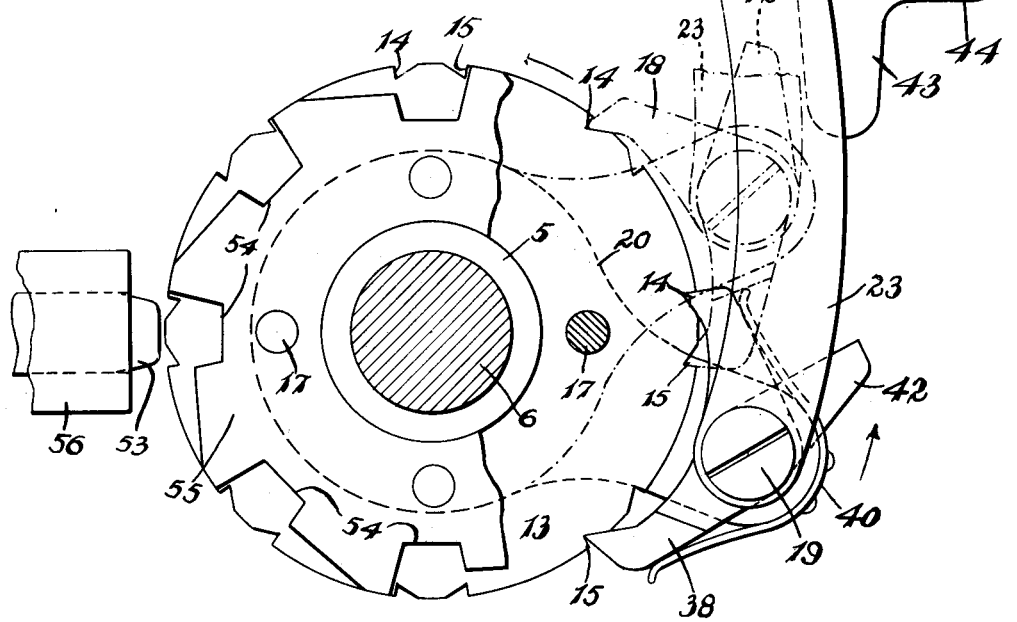
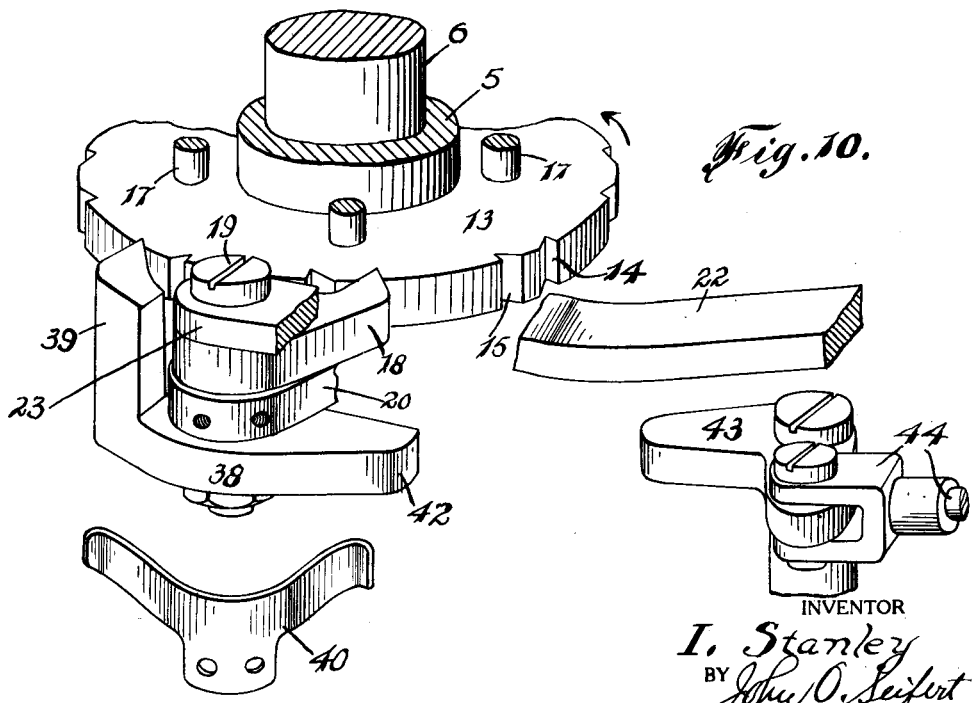

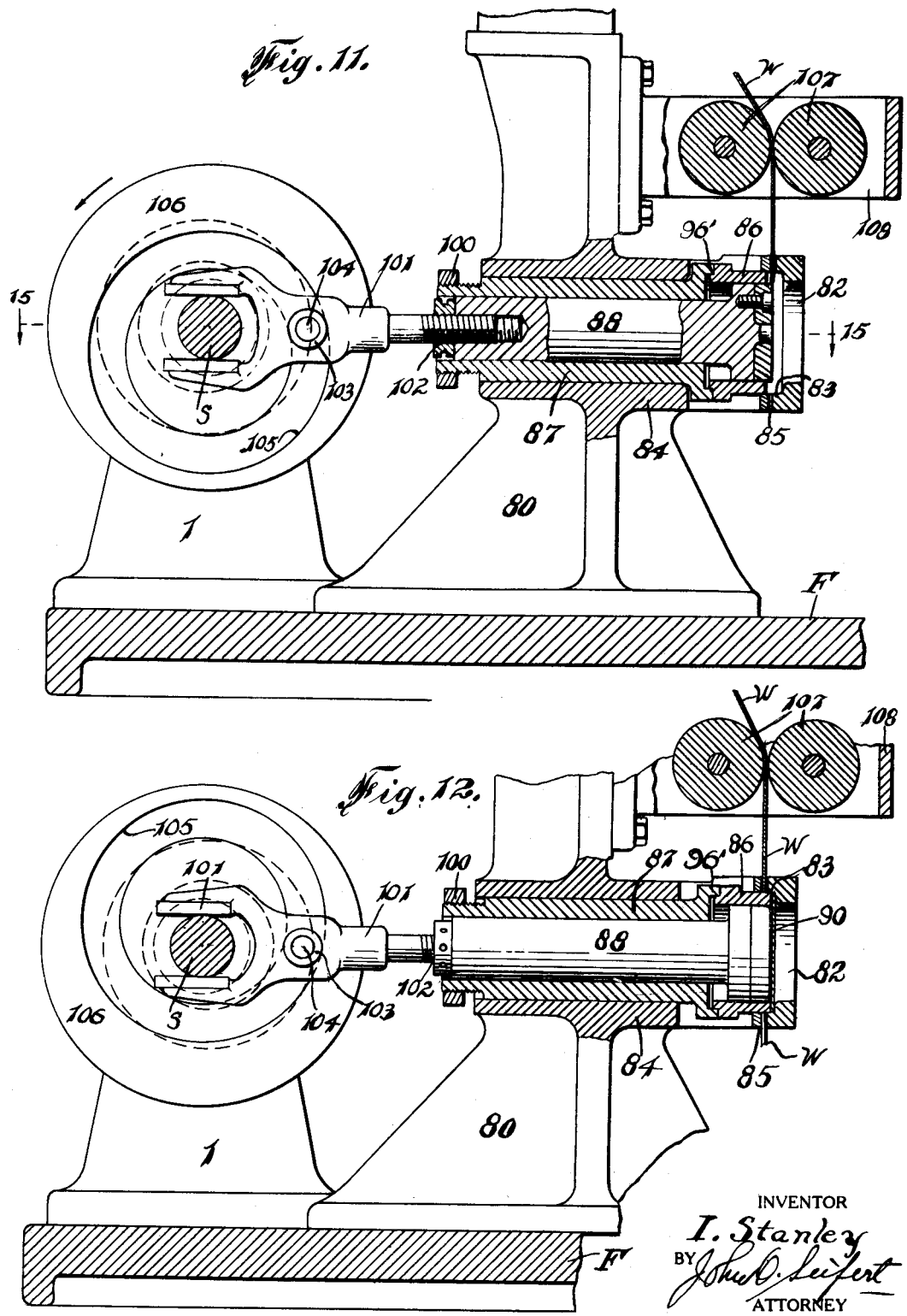

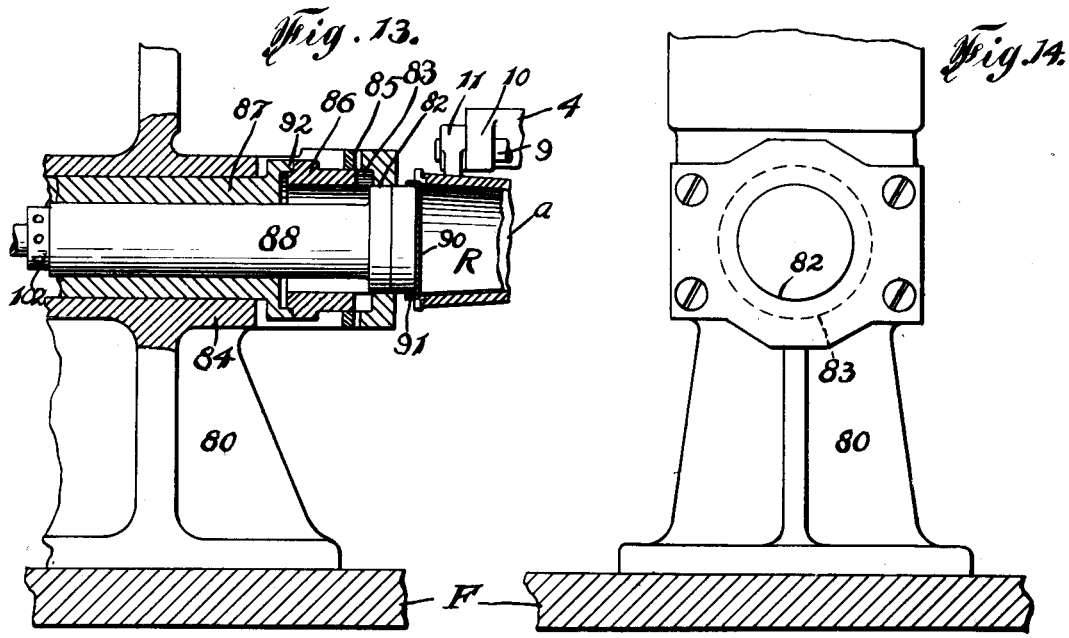
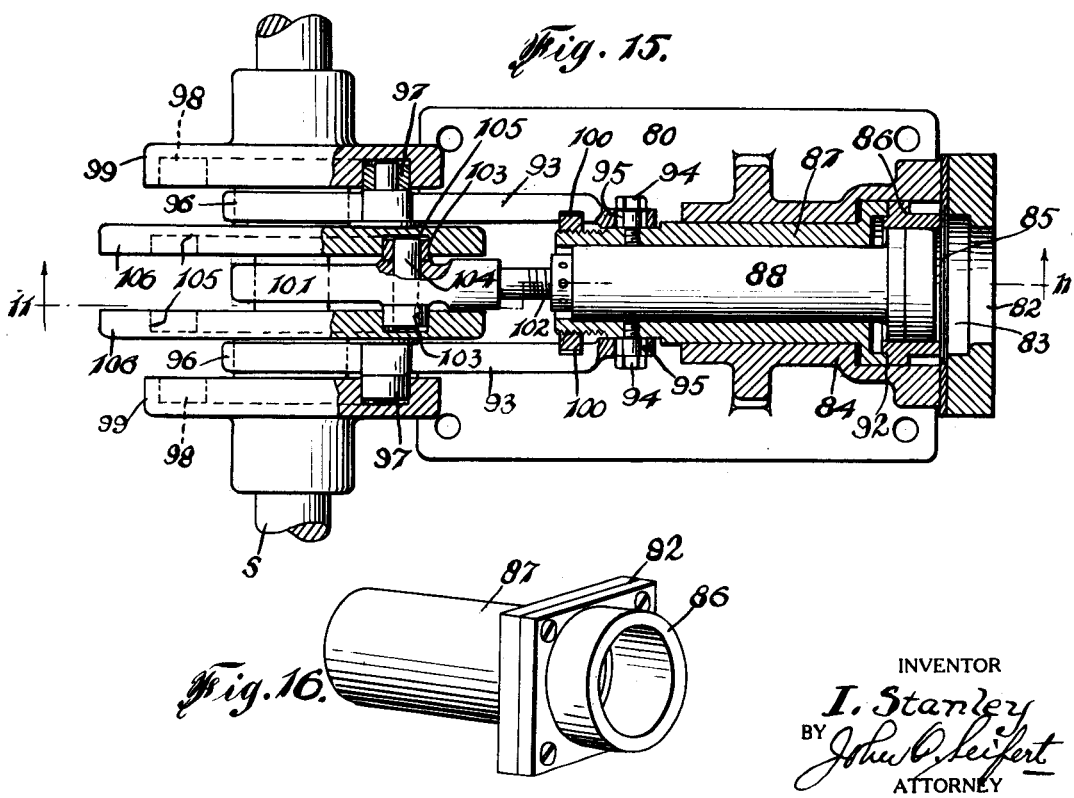

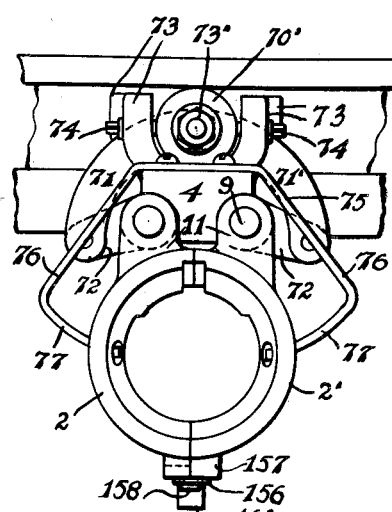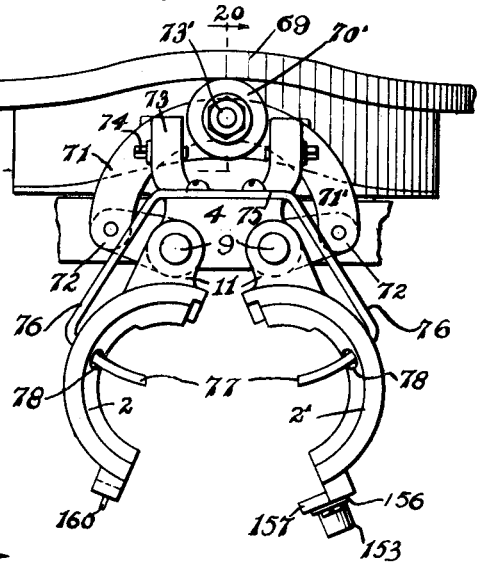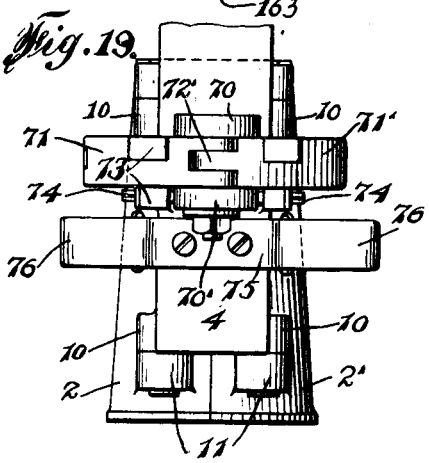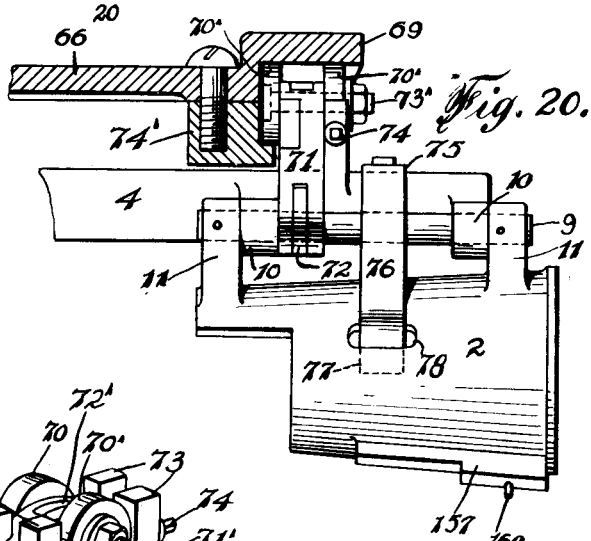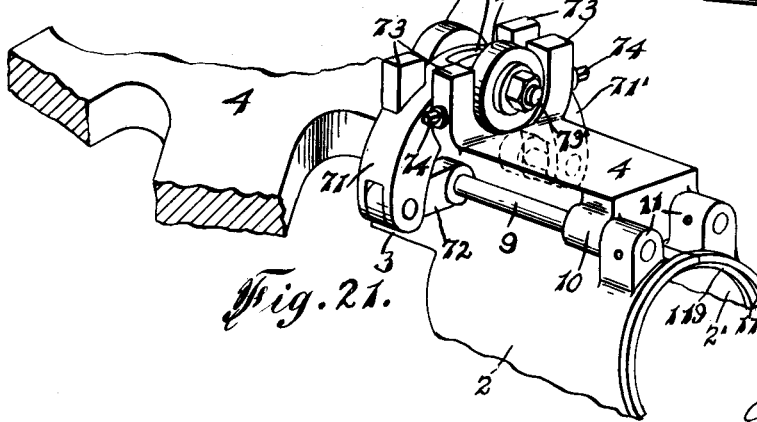

May 10, 1927.
I. STANLEY
1,628,074
APPARATUS FOR MAKING RECEPTACLES
Filed Oct. 8, 1925
12 Sheets-Sheet 9
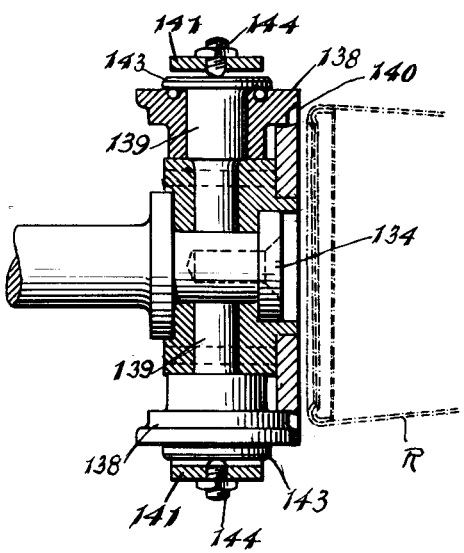
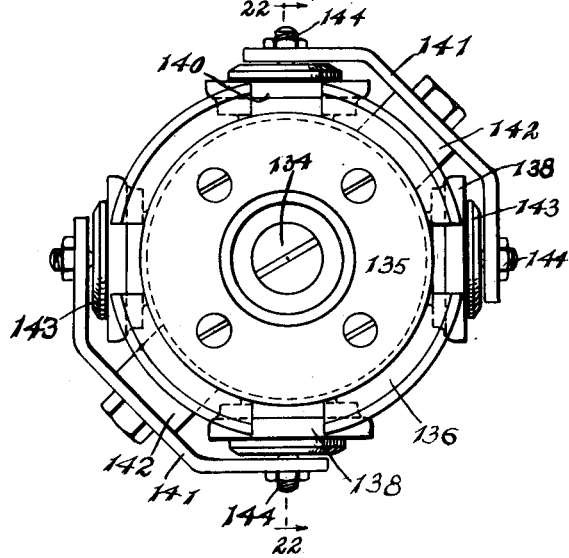
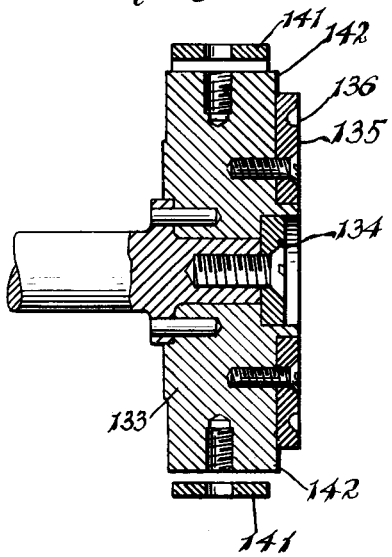
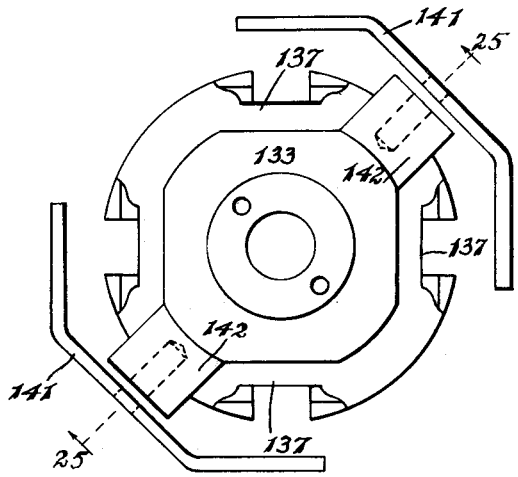
INVENTOR
I. Stanley
BY John C. Leifert
ATTORNEY

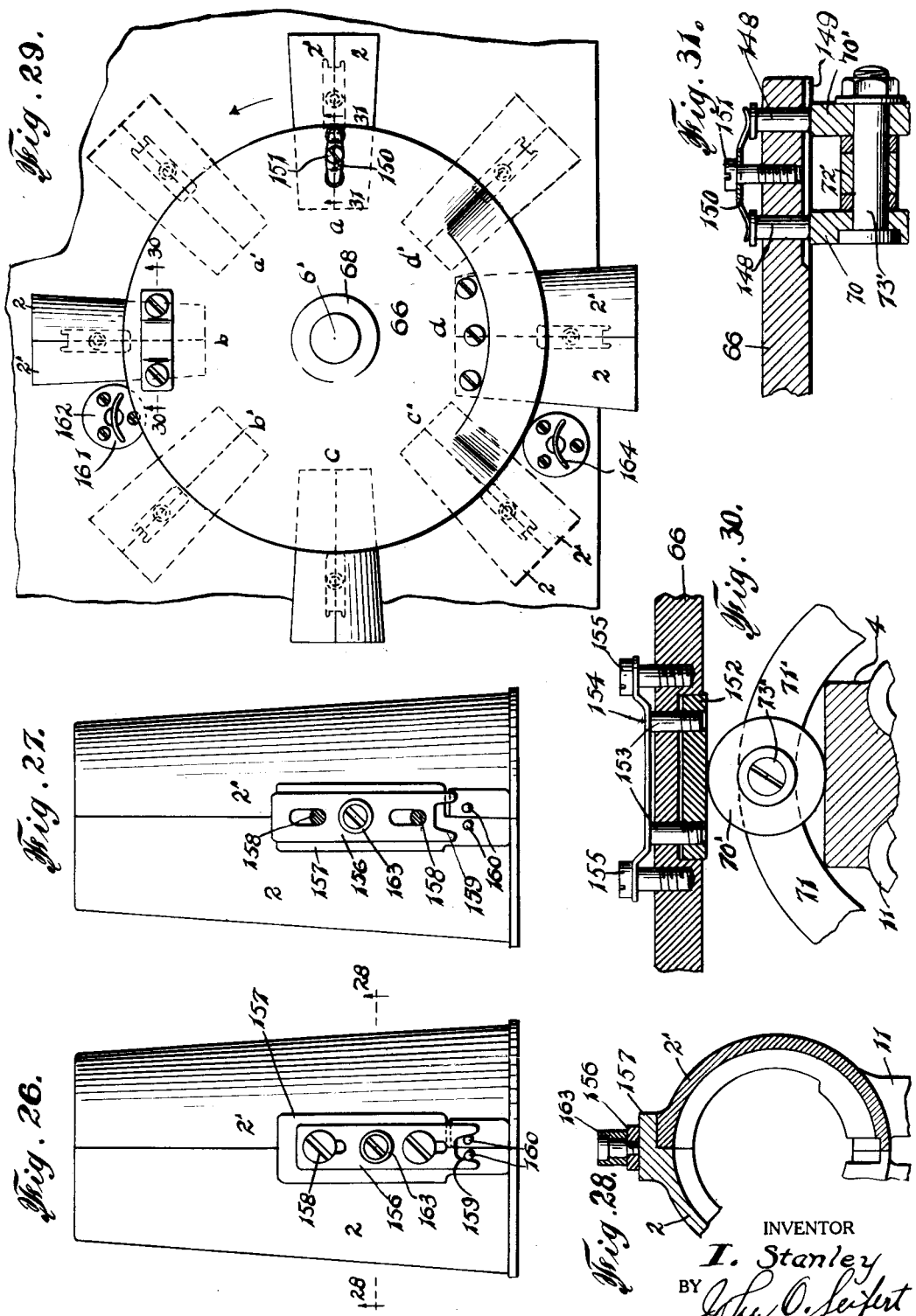

May 10, 1927.
I. STANLEY
1,628,074
APPARATUS FOR MAKING RECEPTACLES
Filed Oct. 8, 1925 12 Sheets-Sheet 11
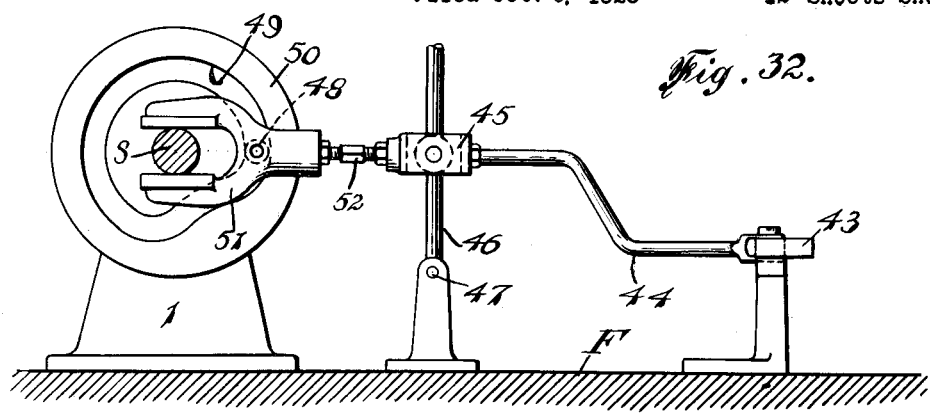
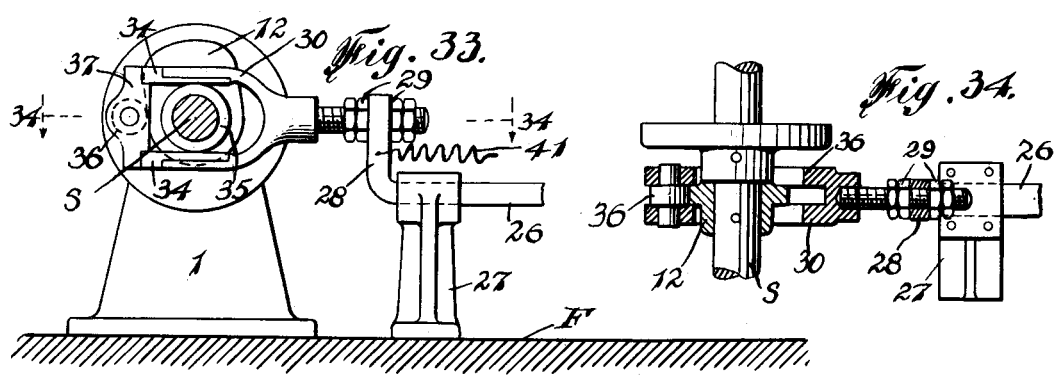
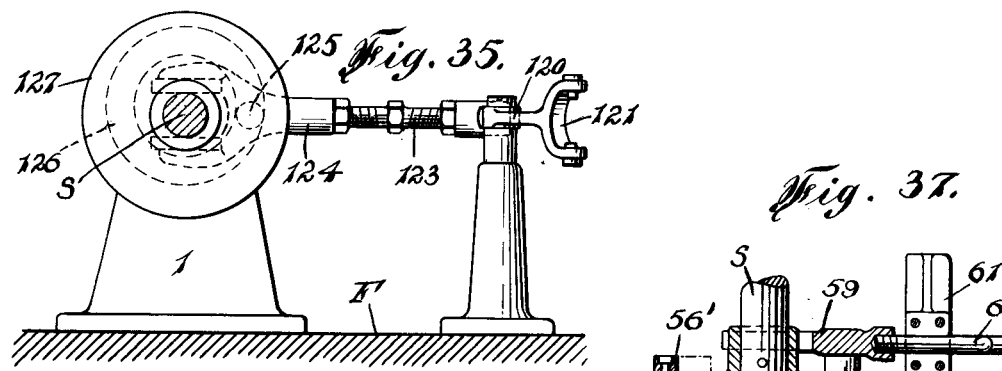
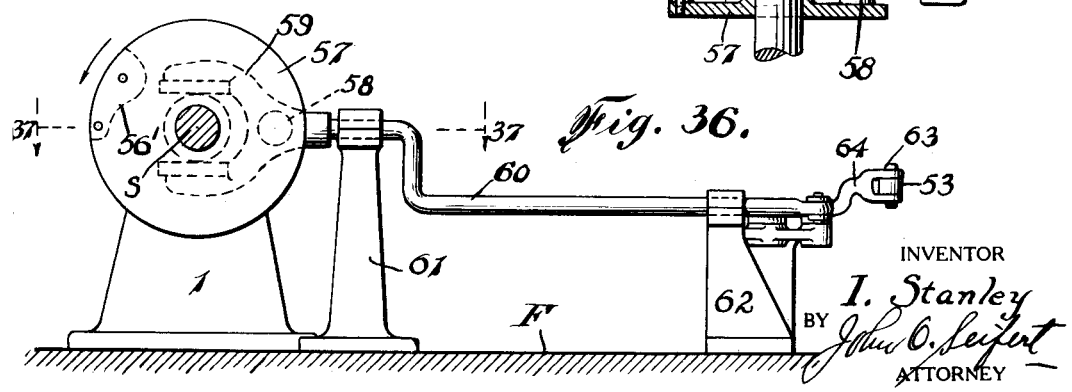
INVENTOR
I. Stanley
BY
ATTORNEY May 10, 1927.
I. STANLEY
1,628,074
APPARATUS FOR MAKING RECEPTACLES
Filed Oct. 8, 1925
12 Sheets-Sheet 12
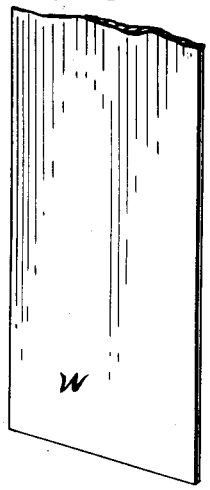
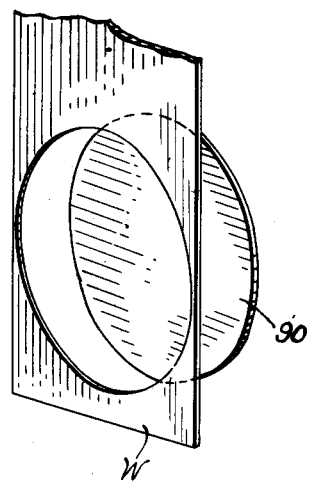
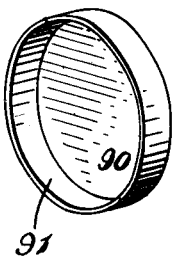
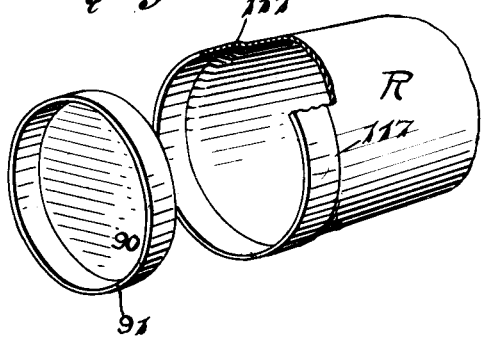
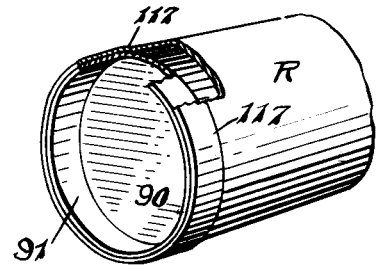
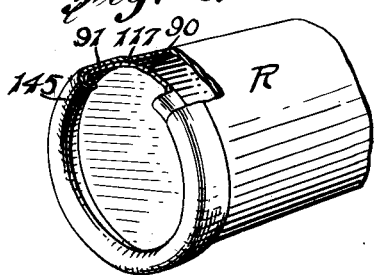
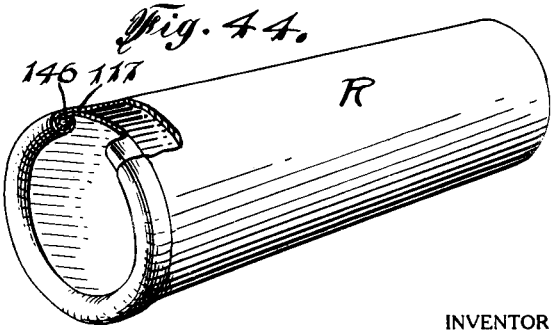
INVENTOR
I. Stanley
BY
ATTORNEY Patented May 10, 1927.

1,628,074

UNITED STATES PATENT OFFICE.

IRVING STANLEY, OF NEW YORK, N. Y., ASSIGNOR, BY MESNE ASSIGNMENTS, TO SEALED CONTAINERS CORPORATION, OF NEW YORK, N. Y., A CORPORATION OF DELAWARE.

APPARATUS FOR MAKING RECEPTACLES.

Application filed October 8, 1925. Serial No. 61,174.

This invention relates to apparatus for making receptacles or containers as disclosed in Letters Patent No. 1,466,211, issued August 28th, 1923, wherein a receptacle body is formed by wrapping a blank or sheet of paper around a mandrel and securing the blank at the longitudinal edges, the receptacle body so formed being delivered from the mandrel to a rotatably supported holder and successively presented to means to stamp a disk from a web, peripherally flange the disk and insert the flanged disk in an end in the receptacle body to serve as a closure therefor, after which the holder with the receptacle body is advanced to means to upset or roll in the disk flange and contiguous portion of the receptacle body to secure the closure therein, when the holder is further advanced to position to deliver or eject the receptable body with the closure in the one end, or the receptacle, from the holder, and it is the primary object of the invention to improve the general construction and arrangement of apparatus of this character for forming and applying the closures to the receptacle bodies.

In this apparatus the receptacle body holder is in the form of a pair of semi-circular sections or flaps pivotally supported by a carrier to have opening and closing movement on axes extending longitudinally thereof, said carrier being mounted to have movement on an axis transverse to the axis of the holder, and it is a further object of the invention to provide an improved receptacle holder and means to cause the same to assume an open and closed position together with improved means for intermittently rotating the holder carrier with the holder.

Another object of the invention relates to improved means for stamping a disk from a web, peripherally flanging said disk and inserting the same into a receptacle body in the holder position relative to said means by the holder rotating means.

As stated, the apparatus is particularly adapted for making receptacles of paper, wherein the flanged closure at the one end of the receptacle is of greater thickness than the material of the body of the receptacle and in the apparatus of the patent hereinbefore referred to great difficulty was experienced in arranging the closure disk with the flange due to the stiffness of the material, and it is a further object of the invention to provide means to moisten and render pliable the web from which the closure disks are stamped whereby the disk may be readily stamped from the web and then flanged.

A further object of the invention relates to improved means for securing the flanged closure disk in the end of the receptacle body wherein the receptacle body with the closure disk inserted therein is advanced from the closure forming means to means to primarily break down and roll in the contiguous portions of the closure flange and receptacle body, and then advance the holder to means to roll in said contiguous portions of the closure flange and receptacle body to secure the closure in the receptable body.

Another object of the invention relates to improved means to control the movements of the holder sections to maintain them in closed position during the period or cycle of movement of the holder from the position to receive a receptacle, as the closure is being formed and applied to the end thereof and the securing of the closure therein and permit the holder sections to assume an open position at the ejecting position, comprising a disk cam juxtaposed to the holder carrier and providing said cam with means to permit of a slightly yielding opening or expanding movement of the holder sections when in position to receive a receptacle to compensate for variations in the size of receptacles, and also when positioned relative to the closure disk forming and applying means to permit of yielding opening or expanding movement of the holder sections to compensate for variations in thickness of the material of the closures.

A further object of the invention is to provide means in the holder sections whereby as the flanged closure disk is inserted into a receptacle body in the holder the receptacle body is arranged with an annular seat for the engagement of the flanged closure disk and thus firmly hold the closure disk against movement into the receptacle body as the same is presented to and being acted on by the closure securing means.

Another object of the invention is to provide means to lock the holder sections in closed position to prevent opening of expanding movement of the sections during the action of the means for securing the closure in the receptacle body, and to provide means to automatically actuate said locking means during the advancing movement of a holder from the closure forming and applying means to the means to secure the closure in the receptacle body, and to automatically release said locking means during the advancing movement of the holder from the closure securing means to the receptacle ejecting position of the holder.

Other objects and advantages will hereinafter appear.

In the drawings accompanying and forming a part of this specification I have shown an embodiment of the invention, wherein Figure 1 is a plan view of the holder carrier removed to show the rotating means for the holder carrier and its actuating means, and also the means to moisten and render the web from which the closure disks are stamped removed to more clearly show the means to stamp the disk from the web, flange and apply the same to a receptacle body.

Figure 2 is an end elevation, looking at the bottom of Figure 1, of the means for stamping a disk from a web, flanging and applying said disk to a receptacle body in a holder, and showing the holder means for the receptacle bodies in relation thereto.

Figure 3 is an elevational view, partly broken away to show the interior arrangement, of the means to moisten and render the web pliable from which the closure disks are stamped.

Figure 4 is a cross sectional view of the means to moisten and render the web pliable taken on the line 4—4 of Figure 3 and looking in the direction of the arrows.

Figure 5 is a longitudinal sectional view of the means to moisten and render the web pliable taken on the line 5—5 of Figure 4 looking in the direction of the arrows.

Figure 6 is a sectional view on an enlarged scale of the holder carrier and its actuating means to show the mounting thereof, the view being taken on the line 6—6 of Figure 1 looking in the direction of the arrows.

Figure 7 is a side elevation looking at the right of Figure 1 showing the holder carrier in relation to the closure disk forming and applying means with a holder in position to receive a receptacle body, a holder positioned relative to the closure securing means, and a holder open and in receptacle ejecting position.

Figure 8 is a side elevation on an enlarged scale of the holder carrier rotating means taken on the line 8—8 of Figure 7 looking in the direction of the arrows.

Figure 9 is a plan view on an enlarged scale of the holder carrier rotating means taken on the line 9—9 of Figure 8 looking in the direction of the arrows, and showing the rotating means in normal position in full lines and in holder carrier advanced position in dot and dash lines.

Figure 10 is a perspective view on an enlarged scale, partly broken away and partly dissembled, of the holder carrier rotating means.

Figure 11 is a sectional side elevation of the means to stamp a disk from a web, and the means to flange and insert the flanged disk into the end of the receptacle in a holder, and showing the parts in normal operative position, said section being taken substantially on the line 11—11 of Figures 1 and 15 looking in the direction of the arrows.

Figure 12 is a view similar to Figure 11 but showing the parts in position with the disk stamped from the web and to flange the stamped disk.

Figure 13 is a sectional side elevation of a portion of the means to stamp a disk from a web and the means to flange and insert the same in a receptacle body, and showing the parts in relation to and inserting the flanged disk in a receptacle body in a holder.

Figure 14 is an enlarged elevation looking at the front of the means to stamp a disk from a web and flange the same.

Figure 15 is a sectional-plan view of the means to stamp a disk from a web and flange the same taken on the line 15—15 of Figure 11.

Figure 16 is a perspective view of a punch or die for cutting or stamping a disk from a web.

Figure 17 is an end elevation of the holder for receptacle body showing the holder sections in closed position and the cam actuating means to maintain the same in closed position, and also showing means in relation thereto operative when the sections are moved to open position to release a receptacle from the holder.

Figure 18 is a view similar to Figure 17 but showing the holder sections in open position and the manner of the ejecting means co-operating therewith to release a receptacle therefrom.

Figure 19 is a plan view of the holder looking at the top of Figure 17.

Figure 20 is a sectional side elevation of the holder taken on the line 20—20 of Figure 18 looking in the direction of the arrows.

Figure 21 is a fragmentary perspective view of a holder and showing the same in relation to its carrier.

Figure 22 is a sectional side elevation of a spinning head for primarily breaking down and also for rolling in the contiguous portions of the flange of the closure disk and receptacle to secure the closure disk in the receptacle body, and showing in dot and dash lines a receptacle body in relation thereto.

Figure 23 is a front elevation of the spinning head shown in Figure 22 looking at the right thereof.

Figure 24 is an end elevation looking at the left of Figure 22 of a carrier for and forming a part of the spinning head.

Figure 25 is a sectional view taken on the line 25—25 of Figure 24 looking in the direction of the arrows.

Figure 26 is a view of the holder looking at the bottom thereof to show the means for releasably locking the holder sections in closed position, and showing the same in locking position.

Figure 27 is a view similar to Figure 26 but showing the locking means released.

Figure 28 is a cross sectional view, partly broken away, of a holder taken on the line 28—28 of Figure 26 looking in the direction of the arrows.

Figure 29 is a plan view of a cam for controlling the closing and opening movements of the holder sections and showing the holder in different positions in relation thereto, and the means to actuate the lock means for the holder sections shown in Figures 26 and 27.

Figure 30 is a cross sectional view on an enlarged scale taken on the line 30—30 of Figure 29 showing the compensating means arranged in the cam disk relative to the means for forming the closure disk and showing cam followers carried by the actuating means for the holder sections in relation thereto.

Figure 31 is a sectional view on an enlarged scale taken on the line 31—31 of Figure 29 looking in the direction of the arrows, and showing the compensating means arranged in the cam disk relative to the receptacle body receiving position of the holder and showing the cam following rollers carried by the actuating means for the holder sections in relation thereto.

Figure 32 is an end elevation taken on the line 32—32 of Figure 1 of means for releasing the overthrow dog of the holder carrier rotating means and its cam actuated operating means.

Figure 33 is an end elevation taken on the line 33—33 of Figure 1 showing the actuating cam for and the means to connect the same to the holder carrier rotating means.

Figure 34 is a sectional plan view taken on the line 34—34 of Figure 33.

Figure 35 is a sectional view taken on the line 35—35 of Figure 1 and showing cam actuated means to move the means for primarily breaking down the contiguous portion of the disk flange and receptacle body mounted on the power shaft of an electric motor toward and away from a receptacle in a holder positioned relative to said means.

Figure 36 is a sectional view taken on the line 36—36 of Figure 1 showing actuating means for a detent to co-operate with the holder carrier rotating means to releasably lock said carrier in its advanced position and showing the actuating cam for and its connection with said means.

Figure 37 is a sectional view taken on the line 37—37 of Figure 36.

Figure 38 is a perspective view of a portion of the web from which the closure disks are stamped.

Figure 39 is a view similar to Figure 38 showing the manner of stamping a disk from the web and the disk in relation thereto.

Figure 40 is a perspective view of a flanged closure formed from the disk stamped from the web shown in Figure 39.

Figure 41 is a perspective view showing a flanged closure disk in relation to the end of the receptacle body to which it is to be applied.

Figure 42 is a perspective view, partly broken away, of a portion of the receptacle body with the flanged closure inserted therein.

Figure 43 is a perspective view, partly broken away, of a portion of the receptacle body with a flanged closure inserted therein and with the contiguous portions of the closure flange and receptacle body primarily broken down preparatory to rolling the same inward to secure the closure in the receptacle.

Figure 44 is a perspective view of the receptacle, partly broken away, to show the manner of securing the flanged closure in the one end of the receptacle body.

Similar characters of reference designate like parts throughout the different views of the drawings.

Figure 1:
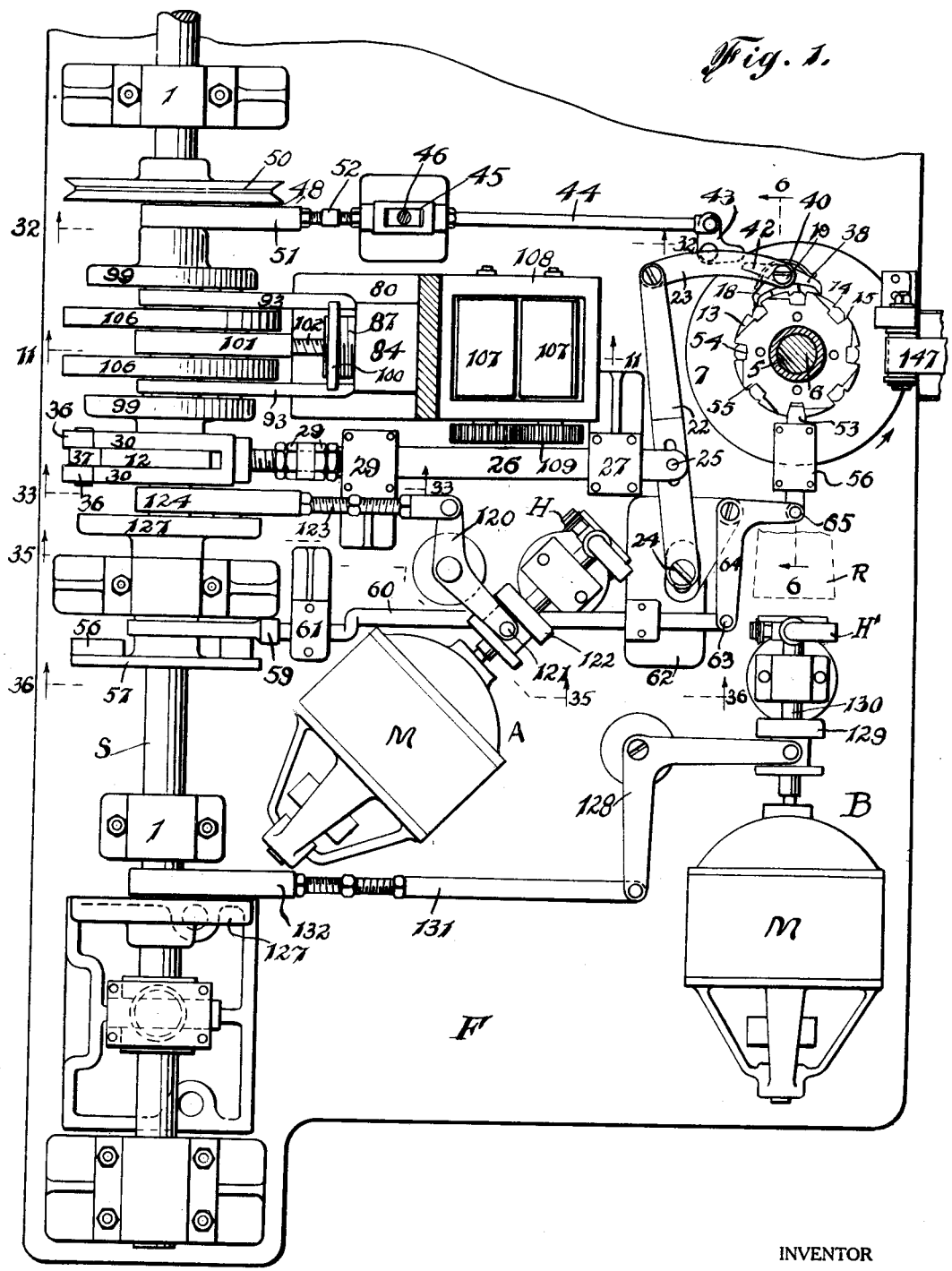

The apparatus of the present invention is primarily adapted for use with or to form a part of means for making receptacle bodies to apply closures to receptacle bodies delivered thereto from the receptacle body making means, although it will be obvious that it may be used independent of the receptacle body making means.

In the embodiment of the invention illustrated in the drawings the operative mechanism is mounted upon a framework F which is a part of the framework of the receptacle body making means when combined therewith, and the mechanism is actuated from a drive shaft S journalled in bearing members 1 mounted upon the framework and driven from a suitable source of power, not shown.

Receptacle bodies to which closure disks are to be applied to one end, designated in a general way by R, are engaged in a holder during the applying of the closure thereto, there being preferably a plurality of said holders, in the present instance shown as four in number designated in a general way at a, b, c and d in Figure 29, mounted on a carrier to extend radially therefrom in equidistant spaced relation and intermittently and successively positioned by said carrier from a position in which the receptacle bodies are inserted into the holder, as shown at $a$, to means to form and insert a closure in the receptacle body in the holder, to means to secure the closure therein, and to position to eject the receptacle body with the closures therein, or the receptacle, from the holder. In the present instance eight intermittent movements are imparted to the holder carrier in each revolution thereof. From the receptacle body receiving position $a$ a holder is moved to position $a'$, from said position $a'$ to position $b$ relative to the closure forming and applying means, from position $b$ to position $b'$ where the closure and receptacle body are subjected to means to primarily break down a flange on the closure and the contiguous receptacle body in the holder, and from position $b'$ to position $c$ where the closure is secured into the receptacle body, from position $c$ to position $c'$ and from the latter to ejecting position $d$ and from said position $d$ to position $d'$ intermediate the ejecting and receptacle body receiving position $a$, and thence to the receptacle body receiving position $a$.

The receptacle body holders each comprise a pair of flaps or sections 2, 2' of semi-circular shape in cross section, and in the present instance of tapered or truncated conical form with the section at the smaller end cut away, as at 3. The holder sections are pivotally mounted on a carrier to have movement on axes extending parallel with the longitudinal axis of a holder with the holders radiating outward in a horizontal plane in equidistant spaced relation from the carrier and the latter rotatable on an axis transverse to the axes of the holders. The carrier comprises a series of four arms 4 fixed to and extending radially from a head 5 rotatable on a vertical shaft or column 6 mounted to have axial adjustment in a standard 7 fixed upon the framework, the shaft being secured in adjusted position by a set screw 8, the arm carrying head 5 being supported upon said standard 7. The holder sections are pivotally suspended from the carrier arms 4 by pins or shafts 9 rotatably mounted in ears 10 extending from opposite sides of the arms. The holder sections are arranged adjacent one edge portion and at each end with laterally extending perforated ears 11 for engagement with the ends of the shafts 9 and secured therein as by a pin or otherwise (Figures 17 to 21). The holder sections are so constructed and arranged that they will assume an open position as shown in Figure 18.

The holder carrier has intermittent movements imparted thereto in the direction of the arrow indicated in Figures 1 and 29 by means actuated from a cam 12 fixed to the drive shaft S, said rotating means comprising a disk 13 (Figures 1, 9 and 10) arranged with a series or sets of notches 14, 15 equidistantly spaced around the periphery. The notches 14 are in the form of ratchet teeth having a front wall arranged substantially in parallel relation to a line extending radially from the axis of the disk while the following wall is arranged at an angle thereto as shown. The notches 15 are also in the nature of ratchet teeth arranged in opposed relation to the notches 14 in that the following wall of each notch is substantially in a plane with a line extending radially from the axis of the disk with the front wall inclined at an angle to said following wall, as shown. The disk 13 is mounted on a reduced portion of the head 5 in contiguous relation to the top of the standard 7, as shown at 16 (Figure 6), and is coupled to the head 5 of the holder carrier by screws and pins, as at 17. The disk 13 is operatively connected to and rotated from the movement of the cam 12 by a pawl 18, to co-operate with the disk notches 14, pivotally mounted on a stud 19 fixed in a projecting portion of a collar 20 rotatably mounted on a reduced portion of the standard 7, as at 21 (Figure 6), the pawl carrying collar being connected to one end of a lever 22 (Figure 1) by a link 23 connected at one end of the lever and at the opposite end to the pawl carrying stud 19, the lever being pivotally mounted at 24 on a block fixed upon the framework. The lever has a pin and slot connection 25 with a rod 26 mounted to have longitudinal sliding movement in blocks 27 fixed upon the framework, with the end of said rod opposite to its connection with the lever 22 being bent at a right angle, as at 28 (Figure 33), having an adjustable connection 29 with a bifurcated member the legs 30 (Figure 1) of which engage at opposite sides of the cam 12, and each leg 30 bifurcated to straddle the shaft S as shown in Figure 33, and carrying guides 34 to engage at opposite sides of rollers 35 fixed to the shaft at opposite sides of the cam. Longitudinal movement is imparted to the rod 26 by a roller 36 rotatably carried in a member 37 fixed to the ends of the legs 30 of the bifurcated member.

To prevent overthrow of the holder carrier and positively position the holder relative to the respective stations, a dog 38 is pivotally mounted on the collar 20 to have movement on an axis common with the axis of the pawl 18 by mounting the same upon the stud 19. The dog is mounted on the stud below the collar 20 and is arranged at one end with a pallet 39 extending at a right angle to the dog and in parallel relation to the axis of the stud 19, and is adapted to co-operate with the disk notches 15. The overthrow dog and pawl 18 are yieldingly urged in a direction toward the disk by a leaf spring 40 secured intermediate its ends to the projecting portion of the collar 20 carrying the pawl and dog and arranged with one end engaging with the pawl and the opposite end with the dog and constructed so that the inherent tension thereof will move the pawl and dog toward the feed disk. As the pawl and dog carrying collar is moved through its connection with the cam 12 in the direction of the arrow indicated in Figure 9 the pawl will engage with a disk notch 14 and advance the disk and thereby the holder carrier. It will be noted that the dog 38 during this movement is at all times in engagement with the disk notch 15 and any movement of the disk independently of the movement imparted thereto by the pawl is arrested by the dog or taken up in the dog supporting stud 19. The cam following roller 36 is mounted in operative relation with the cam and return movement imparted to the holder carrier shafts means by a spring 41. To release the dog from a disk notch 15 and thus prevent retrograde movement of the disk the dog is positively released from the disk notch at the terminus of the advancing movement of the disk. For this purpose the dog is arranged with a heel 42 which at the terminus of the disk advancing movement of the pawl carrier is positioned relative to a tripper in the form of an angle lever 43 pivotally mounted upon the framework, and connected by a link 44 (Figures 1 and 32) with a guide member 45 mounted on a rod 46 pivotally supported and extending upward from the framework, as at 47. The tripper is actuated by a roller 48 engaging in a cam groove 49 in a disk 50 fixed to the drive shaft S, said roller being carried at one side of a bifurcated member 51 straddling the shaft and adjustably connected to the guide member 45, as at 52. The disk or wheel 50 in which the cam groove 49 is arranged, is provided with the peripheral groove for a driving belt to actuate a part of the receptacle body forming means, which does not constitute a part of the present invention.

To retain the holders in advanced position releasable locking means is provided and shown as comprising a detent 53 to be releasably engaged in a recess 54 arranged in the periphery of a disk 55 arranged on the reduced portion of the head 5 of the holder carrying arms in superposed relation to the pawl and dog feeding disk 13 and secured to said disk and the head 5 by the screws or pins 17, the recesses 54 being arranged in alinement with the notches 14 and 15 in the feeder disk. The detent 53 is slidably mounted in an arm 56 extending laterally and upward from the supporting standard 7 for the holder carrier mounting shaft 6 and moved in a direction toward and away from the periphery of the disk 55 by a cam portion 56 (Figures 36 and 37) secured on a face of a disk 57 fixed on the driving shaft S engaging a lug 58 extending laterally from a bifurcated member 59 straddling the shaft connected to a rod 60 slidably mounted in brackets 61 and 62 mounted on the framework; said rod having a pivotal connection 63 (Figure 1) with one arm of an angle lever 64 also pivotally mounted upon the bracket 62, the arm of which has a pivotal connection 65 with the detent 53.

As stated, the holder sections 2, 2' are so constructed, arranged and suspended that they will assume an open position, as shown in Figure 18. To move and retain the holder sections in closed position during an interim of movement thereof with the holder carrier, or during the period of insertion of the receptacle body therein, the forming and inserting of the closure and the securing of the closure therein, and the movement of the holder sections to open position as it approaches the ejection station, a cam disk 66 is mounted upon the holder carrier mounting shaft 6 juxtaposed to said holder carrier and fixed to said shaft, as by a key 67, and to have adjustment toward and away from the holder carrier by a nut 68 threaded onto the end of the shaft 6. The cam face is provided with a recessed portion at the ejecting station, as shown at 69 (Figures 7, 18 and 20). The holder sections are moved to and retained in closed position by cam following rollers 70, 70' rotatably carried by arms 71, 71' having pivotal connection with arms 72 fixed to and extending laterally from the shafts or pins 9, the roller carrying arms 71, 71' being constructed and arranged to extend in an upward direction and toward each other and have an interengaging connection 72' (Figure 19) and pivotally connected by a pin 73' upon which the cam following rollers are mounted with the rollers engaging between the disk cam and the carrier arms 4 for the holder sections and held against lateral displacement by engaging between lugs 73, the roller 71 being centered between the forward lugs 73 by adjustment screws 74. It will be obvious that as long as the cam rollers engage with the flat and horizontal portion of the cam disk the holder sections will be maintained in closed position, and as the rollers ride along the raised portion 69 of the cam disk they will assume an open position. However, to assure the holder sections to spread at the ejecting position thereof a part 74' having a recessed portion and conforming to the shape of the raised cam portion 69 is secured to the bottom of the disk and co-operates with said raised cam portion to form a raceway for the engagement of the cam rollers 70', as clearly shown in Figure 20. This raceway may extend for the entire circumference of the cam disk, if desired. To release a receptacle from the holder as the holder sections are spread or expanded, as shown in Figure 18, receptacle ejecting fingers are provided, these fingers being shown as constructed of a single piece or strip of metal 75 fixed intermediate its ends upon the holder carrying arms 4 with the ends extended downward and diverging outward as at 76, and the extremities 77 bent inwardly toward the holder sections in relation to openings 78 in said holder sections, said extremities being of a length to extend outside of the inner surface of the holder sections when collapsed and adapted to pass through said openings when the holder sections are expanded, thus stripping the receptacle from the holder sections as they are moved to open position.

The closure forming means is arranged at the station *b* (Figure 29) and embodies punch and die mechanism carried by a standard 80 mounted upon the framework F to stamp disks from a paper web W, a supply roll D of which web is rotatably mounted in a support 81 fixed to and extending upward from the standard 80. Successively to the stamping of the disk from the web they are peripherally flanged and the flanged disks inserted into the end of the receptacle body carried by a holder positioned relative to said means. This means comprises a plate arranged with an opening therethrough having two diameters 82 and 83 and secured in axial relation to the end of a tubular portion 84 of the standard 80 with the portion of the opening having the larger diameter in contiguous relation to the end of the bore in said tubular portion, and with the plate in spaced relation to said tubular member to provide a space for the feeding of the web W therethrough, as shown at 85 (Figures 11, 12, 13 and 15). A punch head 86 connected to and reciprocable with a hollow plunger 87 in the tubular part 84 co-operates with the portion of larger diameter 83 of the plate opening to stamp the disk 90 from a portion of the web interposed between the plate and the end of the tubular member 84, as shown in Figure 39. As the disk is stamped from the web an enlarged end or head of a plunger 88 reciprocatory in the hollow plunger 87 moves inward forcing the disk through the plate opening of smaller diameter and thereby arranging the disk with a peripheral flange 91, as shown in Figure 40, the continued movement of the plunger 88 inserting the flanged disk into the end of the receptacle body in the holder to constitute the bottom of the receptacle, as shown in Figure 13, the receptacle body being of such length as to partly extend from the holder. The connection of the punch head 86 with the plunger 87 is preferably of square shape, as shown at 92 in Figure 16, and the outer end of the opening in the tubular portion 84 of the standard 80 is correspondingly shaped, whereby to hold the punch and its actuating plunger against rotation for a purpose to be hereinafter described.

The punch head carrying plunger 87 is reciprocated by a pair of bars 93 connected at one end to opposite sides of the plunger by headed studs 94 threaded into the plunger and engaging in elongated openings 95 in the connected members, said members extending rearwardly and having the opposite ends bifurcated, as at 96, for the engagement of the drive shaft S, with rollers 97 rotatable on studs extending laterally from the connecting members engaging in cam grooves 98 in disks 99 fixed to the drive shaft. To provide an adjustable connection between the punch head carrying plunger 87 and the connecting members 93 the inner end of the plunger is externally threaded and has a collar threaded thereon adapted to engage in recesses in the connecting members 93, as shown at 100 in Figure 15.

The flanging plunger 88 is reciprocated from the drive shaft S in proper timed sequence with the reciprocation of the punch carrying plunger 87 by a bifurcated member 101 straddling the drive shaft having an adjustable connection 102 with the plunger, and rollers 103 rotatable on a pin 104 projecting from opposite sides of the yoke member 101 engaging in cam grooves 105 in opposed faces of a pair of disks 106 fixed to the drive shaft and between which disks the yoke member 101 engages. (Figures 11, 12, and 15.)

The web is positively fed from the supply roll to the space 85 between the punch and die mechanism by a pair of rollers 107 rotatably mounted in a bracket 108 (Figure 1) projecting forward from the bracket 80 with the bite of the rollers in line with the space 85 to guide the web thereto, the web being laterally guided by the sides of the roller carrying frame 108. The rollers are positively driven in a suitable manner by a pair of meshing gears 109 from the drive shaft S as by pawl and ratchet mechanism actuated from the drive shaft as in the structure of the patent hereinbefore referred to.

To render the web pliable so that the disk stamped therefrom may be readily flanged means are provided to spray a vapor onto the web as it is delivered from the supply roll. For this purpose there is provided a drum 110 mounted upon the feed roller supporting bracket 108 in interposed relation to said rollers and the said supply roll. This drum has a slot 111 cut through the peripheral wall and extending longitudinally of the drum over which the web is guided and held against the same by threading the web between the peripheral surface of the drum and a pair of rods 112 extending longitudinally of the drum at opposite sides of the slot. A pipe 113 is mounted in an opening in an end wall of the drum, as at 114, to extend into the drum in contiguous relation to the drum slot to adjacent the opposite end and having said latter end closed, a series of perforations 115 in said pipe opening to the slot. This pipe is also adapted for connection to a source of moist vapor supply, such as steam. The web guided in this manner over the drum slot substantially closes said slot, and the steam entering the pipe is discharged through the pipe perforations against the web in its passage over the drum slot, any water or condensation of the steam collecting in the drum being drained therefrom by a pipe 116 leading from a lower part of the drum and which may be connected in circuit with the steam supply.

To limit the movement of the flanged disk into the receptacle body carried by the holder the receptacle body simultaneously with the inserting of the flanged disk thereinto is arranged with an annular seat for the closure, as shown at 117 in Figures 41 to 44. For this purpose the holder sections are arranged with an insert 118 (Figure 6) at the outer or entering end, each insert having a curved inwardly projecting portion 119, which, when the holder sections are in closed or collapsed position, co-operate to serve as an annular rib or ridge of less diameter than the diameter of the entering portion of the holder. The flanging plunger 88 being of greater diameter than said rib will cause the material of the receptacle to bulge outwardly forming a seat for the flanged closure and prevents the closure from being pushed into the receptacle body.

After the flanged closure has been inserted into the receptacle body in the holder the holder carrier is actuated to advance the holder to position indicated at b' in Figure 29 when the closure flange and the contiguous portion of the receptacle body is subjected to the action of means to primarily break down the same preparatory to upsetting or rolling in the closure flange and the contiguous portion of the receptacle body to secure the closure in the end of the receptacle body to complete the receptacle, which operation is performed as the holder with the receptacle body is advanced to the station indicated at c (Figure 29). The means for breaking down and rolling in the closure flange and contiguous portion of the receptacle body are substantially the same, said means being indicated in a general way at A and B in Figure 1, and description of one will suffice for both. Each of said means embodies an electric motor M mounted upon the framework. A spinning head, indicated in a general way at H and H' in Figure 1, is mounted on the power shafts of the motors to rotate therewith and have axial reciprocatory movement toward and away from the receptacle holders at the stations b' and c, by mounting said heads on a hollow shaft which in turn is mounted on the motor shaft, or the spinning head carrying shafts may have a pilot bearing connection with the motor shafts. The head H is axially movable by a lever 120 one bifurcated end 121 of which lever straddles an annular recess in a collar 122 fixed to the spinning head carrying shaft, the opposite end of said lever having an adjustable link connection 123 (Figures 1 and 35) with a yoke member 124 straddling the drive shaft and carrying a roller 125 on a laterally extending stud for engagement with a cam groove 126 in the face of the disk 127 fixed to the drive shaft. The spinning head H' is similarly reciprocated by a bifurcated end of an arm of a pivoted angle lever 128 engaging an annular recess in a collar 129 on the head carrying shaft 130, the other arm of the lever being connected by an adjustable link 131 with a yoke member 132 carrying a roller to engage a cam groove in a disk on the drive shaft similar to the roller 126 and cam disk 127.

Each of the spinning heads comprises a block 133 having a central bore to mount the same upon the reduced end of its carrying shaft and secured thereon by enlarging the opening at the outer side of the block and engaging a button therein and securing the same to the end of the shaft by a screw, as shown at 134 (Figures 22 and 25). A plate 135 is secured to the face of the block, as by screws, said plate having an annular recess 136 adjacent the peripheral portion with recesses cut through said recessed portion as well as the adjacent block portion, as shown at 137, said recesses being arranged diametrically opposite and ninety degrees apart. Breaking down and upsetting or rolling in rollers 138 are rotatably engaged on shouldered studs 139 fixed in the block to extend radially therefrom in line with the recesses 137 whereby a peripheral portion, as shown at 140, will be in alinement with the plate groove and in which the marginal portion of the disk flange and contiguous receptacle body engage and as the heads are rotated breaking down or rolling in said flange and receptacle portions according to which spinning head the receptacle body is presented. The spinning head rollers are retained on their carrying studs by a pair of plates 141 secured intermediate their ends to lugs 142 extending diametrically opposite from the block 133 and intermediate a pair of the recesses 137, the ends of said plates being arranged to extend across the recesses 137 with a thrust bearing 143 interposed between the ends of said arms and the rollers and held against the rollers by set screws 144 threaded into the plates and bearing against the thrust bearings.

The receptacle with the closure therein after being subjected to the breaking down means A will be substantially as shown at 145 in Figure 43, and after the same has been subjected to the action of the spinning head B the flange of the disk and contiguous portion of the receptacle will be completely rolled in, as shown at 146 in Figure 44.

After the receptacle with the closure has been acted upon to secure the closure therein the holder is advanced from the station c to the station c', and thence to station d. In this latter position of the holder the holder sections will assume an open position as shown in Figures 7, 18, 20 and 29 to eject the completed receptacle therefrom onto conveyor mechanism designated in a general way at 147 in Figure 8.

To facilitate the inserting of the receptacle bodies into the holder at the holder receiving position a and adapt the same to variations in receptacle bodies, compensating means is arranged in the cam disk to permit of yielding expanding or opening movement of the holder flange or sections. This compensating means as shown in Figure 31 comprises a pair of headed pins 148 slidably mounted in and extending through openings in the cam disk in line with a recess extending transversely of the cam face and yieldingly projected beyond the cam face by the ends of a leaf spring 150 adjustably held against the pins by a screw 151 passing through an opening intermediate the ends of the spring and threaded into the disk cam, said pins being in line for engagement by the cam following rollers 70, 70' carried by the arms 71, 71' connected to the holder section supports.

To permit of yielding expansion of the holder sections while the same are positioned relative to the closure forming means to compensate for variations in thickness in the material of the closures a compensating means is arranged in the cam disk at said station, comprising as shown in Figure 30 a plate 152 slidably engaging in a recess in the cam face of the disk and carried by pins 153 slidably engaging in and extending through openings in the cam and connected to a bowed leaf spring 154 connected to the cam disk by headed screws 155 passing through perforations adjacent opposite ends of the spring and threaded into the cam.

To prevent spreading of the holder sections while the closure is being acted upon by the spinning heads to secure the closure in the receptacle body means are provided to positively lock the holder sections together while at the stations b' and c' and release the holder sections as the holder moves from the station c' to station d. This locking means comprises a plate 156 (Figures 26, 27 and 28) slidably mounted on a portion 157 integral with the holder section 2 to extend over the holder section 2' when in closed position by a headed screw 158 passing through slots in the plate and threaded into the portion 157, the one end of the plate having a bifurcation 159 for the engagement of pins 160 extending laterally from the holder sections, as shown in Figure 26. To automatically move the locking plate to locking position, as shown in Figure 26, as the holder moves from station b to station b' a cam 161 (Figure 29) in the form of a curved plate fixed in and projecting up from a support 162 fixed upon the frame work is arranged in the path of movement of the holder carriers to be engaged by a roller 163 carried by the locking plate. The locking plate is automatically released as the holder moves from the station c' to station d by a cam 164 similar to the cam 161 constructed and arranged to engage with the plate roller 163 and move the plate to releasing position as the holder passes said cam.

While I have illustrated and described one embodiment of the invention it will be obvious that various modifications may be made in construction and arrangement of parts, and that portions of the invention may be used without others, without departing from the scope of the invention.

Having thus described my invention I claim:

1. In apparatus for applying a closure to a receptacle body, a holder for a receptacle body, a rotatable carrier for the holder, and means to intermittently advance the holder carrier to position the holder relative to means to form and apply a closure to one end of the body in the holder, to means to break down and upset the material of the closure and receptacle body to secure the closure therein, and to position to eject the receptacle from the holder, comprising a drive shaft, a disk having notches in the periphery thereof rotatable with the holder carrier, a feeding pawl to co-operate with certain of said disk notches to advance the carrier, a dog movable with the feeding pawl to co-operate with other of said disk notches to prevent overthrow of the carrier, a cam on the shaft, and an operative connection between said cam and the pawl and dog to actuate the same.

2. Apparatus for applying a closure to a receptacle body as claimed in claim 1, wherein the feeding pawl and overthrow dog are pivotally mounted in co-axial relation on a carrier to extend in opposite directions and yieldingly urged in a direction toward the disk.

3. Apparatus for applying a closure to a receptacle body as claimed in claim 1, wherein the overthrow dog is released from a disk notch to permit return movement of the holder carrier by means actuated by a cam on the cam shaft.

4. Apparatus for applying a closure to a receptacle body as claimed in claim 1, wherein the feeding pawl and overthrow dog are mounted to have pivotal movement on a common axis on a collar loose on the holder carrier and yieldingly urged in a direction toward the disk, and means including a cam follower for operatively connecting said collar to the cam to actuate the pawl and dog to advance the holder carrier.

5. In apparatus for applying a closure to a receptacle body as claimed in claim 1, a collar loose on the holder carrier on which the feeding pawl and overthrow dog are pivotally mounted to extend in opposite directions from a common pivot support, a spring to urge the pawl and dog in a direction toward the disk, a lever, a link connection between said lever and collar, and an operative connection including a cam follower between said lever and the cam to oscillate the pawl and dog carrying collar to cause the same to co-operate with the disk to advance the holder carrier.

6. Apparatus for applying a closure to a receptacle body as claimed in claim 1, wherein the feeding pawl and overthrow dog are mounted to have pivotal movement on an axis common to both on a collar loose on the holder carrier and yieldingly urged toward the disk, means including a cam follower to operatively connect the collar to the cam to oscillate the collar to actuate the pawl and dog to advance the holder carrier, and means actuated by a cam on the shaft to release the overthrow dog from the disk at the terminus of the disk advancing movement of the pawl carrying collar to permit of return movement of said collar with the pawl and dog.

7. Apparatus for applying a closure to a receptacle body as claimed in claim 1, wherein the pawl and dog are pivotally mounted in co-axial relation on a carrier to extend in opposite directions and yieldingly urged toward the disk, means to operatively connect said pawl and dog carrier to the cam on the shaft to impart movement to the disk and thereby advance the holder carrier, and means to release the dog from the disk notches to permit of return movement of the pawl and dog carrier comprising a tripper to engage and release the dog from the disk, a cam on the shaft, and an operative connection between said latter cam and the tripper.

8. In apparatus for applying a closure to a receptacle body, a holder for a receptacle body, a rotatable carrier for the holder, and means to intermittently advance the holder carrier to position the holder relative to means to form and apply a closure to one end of the body in the holder, to means to break down and upset the material of the closure and receptacle body to secure the closure therein, and to position to eject the receptacle from the holder, comprising a drive shaft, a disk having notches in the periphery thereof rotatable with the holder carrier, a feeding pawl to co-operate with said disk notches to advance the carrier, a carrier for said pawl, an operative connection between said pawl carrier and shaft to impart oscillatory movement to the pawl carrier, and means to releasably lock the holder carrier in its advanced position.

9. In apparatus for applying a closure to a receptacle body, a holder for a receptacle body, a rotatable carrier for the holder, and means to intermittently advance the holder carrier to position the holder relative to means to form and apply a closure to one end of the body in the holder, to means to break down and upset the material of the closure and receptacle body to secure the closure therein, and to position to eject the receptacle from the holder, comprising a drive shaft, a disk having notches in the periphery thereof rotatable with the holder carrier, a feeding pawl to co-operate with said disk notches to advance the carrier, a carrier for said pawl, an operative connection between said pawl carrier and shaft to impart oscillatory movement to the pawl carrier, and means to releasably lock the holder carrier in its advanced position, comprising a second disk juxtaposed to the first disk arranged with equidistantly spaced recesses in the periphery and rotatable with said disk and the holder carrier, a detent for engagement with said recesses, and means operative from the shaft to move said detent into and out of said disk recesses in timed sequence to the movements of the holder carrier advancing means.

10. In apparatus for applying a closure to a receptacle body, a holder for a receptacle body, a rotatable carrier for the holder, and means to intermittently advance the holder carrier to position the holder relative to means to form and apply a closure to one end of the body in the holder, to means to break down and upset the material of the closure and receptacle body to secure the closure therein, and to position to eject the receptacle from the holder, comprising a drive shaft, a disk having notches in the periphery thereof rotatable with the holder carrier, a feeding pawl to co-operate with said disk notches to advance the carrier, a carrier for said pawl, a cam on the shaft, an operative connection between said pawl carrier and shaft to impart oscillatory movement to the pawl carrier, and means to releasably lock the carrier in its advanced position, comprising a second disk arranged with equidistantly spaced recesses in the periphery pivoted to and rotatable with the first disk, a slidably supported detent for engagement in said recesses, a lever connected to said detent, a cam on the shaft, and an operative connection with said cam and lever to actuate the lever and move the detent into and out of said disk recesses in timed sequence to the movement of the holder carrier advancing means.

11. In apparatus for applying closures to receptacle bodies, a series of holders for receptacle bodies, a rotatable carrier upon which said holders are mounted to extend radially therefrom in equidistant spaced relation, and means to intermittently rotate the carrier to successively advance the holders to position relative to means to form a flanged closure and insert the same into the end of a receptacle in a holder, to means to primarily break down the contiguous portions of the closure flange and receptacle body, to means to upset the contiguous portions of the closure flange and receptacle body to secure the closure in the receptacle end, and to position to deliver the receptacles from the holders.

12. Apparatus for applying closures to receptacle bodies as claimed in claim 11, wherein each holder comprises a pair of semi-circular sections, each section being pivotally supported on the carrier to have movement on axes extending longitudinally of the holder and normally adapted to assume an open position by gravity, and means to move said holder sections and retain them in closed position during a predetermined portion of the movement of the holders with the carrier.

13. Apparatus for applying closures to receptacle bodies as claimed in claim 11, wherein each holder comprises a pair of semi-circular sections, each section being pivotally supported by the carrier to have movement on axes extending longitudinally of the carrier and adapted to normally assume an open position by gravity, a fixed cam pivoted to and relative to which the holders with the carrier are movable, and cam followers carried by the pivotal supports of the holder sections to co-operate with said cam to move the holder sections to and retain them in closed position during a predetermined portion of the movement thereof with the holder carrier.

14. Apparatus for applying closures to receptacle bodies as claimed in claim 11, wherein each holder comprises a pair of semi-circular sections and the holder carrier is arranged with radially extending arms, a pair of pins rotatably carried by each arm to extend in parallel relation to each other and the axis of the holders and upon each of which pins a holder section is fixed, said holder sections being adapted to assume an open position by gravity, a fixed cam juxtaposed to the holder carrier and relative to which said carrier is movable, and cam followers carried by the holder carrying pins adapted to co-operate with the cam to maintain the holder sections in closed position for a predetermined portion of the movement of the holders relative to the cam.

15. Apparatus for applying closures to receptacle bodies as claimed in claim 11, wherein each holder comprises a pair of semi-circular sections and the holder carrier is arranged with radially extending arms, a pair of pins rotatably carried by each arm to extend in parallel relation to each other and the axis of the holders and upon each of which pins a holder section is fixed, said holder sections being adapted to assume an open position by gravity, a fixed cam juxtaposed to the holder carrier and relative to which said carrier is movable, an arm fixed to each holder carrying pin to extend laterally thereof, a second arm pivotally connected to each of said first arms to extend in a direction toward each other and over the holder carrier in interposed relation to said holder and the cam, and cam following rollers carried by said latter arm to co-operate with the cam to maintain the holder sections in closed position for a predetermined portion of the movement of the holders relative to the cam.

16. Apparatus for applying closures to receptacle bodies as claimed in claim 11, wherein each holder comprises a pair of semi-circular sections, each section being pivotally supported by the carrier to have movement on axes extending longitudinally of the carrier and adapted to normally assume an open position by gravity, a fixed cam juxtaposed to and relative to which the holders with the carrier are movable, cam followers carried by the pivotal supports of the holder sections, said cam being arranged and the cam followers co-operating therewith to maintain the holder sections in closed position as the holders are advanced from the closure flange upsetting means and as they approach the receptacle delivering position in a cycle of movement of a holder, and ejector fingers fixed to the holder carriers to extend to opposite sides of the holder and having the extremities bent inward to engage and pass through openings in the holder sections as said sections move to open position to engage and deliver a receptacle from the holders as the latter is moved to receptacle delivering position.

17. In apparatus for applying closures to receptacle bodies, a tubular holder for a receptacle body comprising a pair of semi-circular sections, a rotatable carrier upon which said holder sections are pivotally supported to have movement on axes extending longitudinally thereof, means to intermittently rotate said holder carrier from a position to receive a receptacle body to means to stamp a disk from a web, peripherally flange the same and insert it into the end of the receptacle body in the holder, to means for upsetting the contiguous portions of the disk flange and receptacle body to secure the disk therein, and to position to eject the receptacle from the holder, means to normally maintain the holder sections in closed position and adapted to permit the holder sections to open as the holder arrives at the ejecting position, means to releasably lock the holder sections in closed position, and means operative to actuate said locking means as the holder is advanced from the disk forming position to the means for upsetting and securing the disk in the receptacle body, and means to release said locking means as the holder is advanced from the disk upsetting means and previously to its arrival at the ejecting position.

18. Apparatus for applying closures to receptacle bodies as claimed in claim 17, wherein the means to normally maintain the holder sections in closed position comprises a cam juxtaposed to the holder carrier, and cam followers operatively connected to the holder sections to cooperate with said cam.

19. Apparatus for applying closures to receptacle bodies as claimed in claim 17, wherein the means to maintain the holder sections in closed position comprises a cam juxtaposed to the holder carrier with which cam followers operatively connected to the holder sections co-operate, and means arranged in said cam at the position of rest of the holder carrier for inserting a receptacle body into the holder to permit of yielding expansion of the holder sections to facilitate the insertion of a receptacle body and compensate for variations in the size of receptacles.

20. Apparatus for applying closures to receptacle bodies as claimed in claim 17, wherein the means to maintain the holder sections in closed position comprises a cam juxtaposed to the holder carrier with which cam followers operatively connected to the holder sections co-operate, and means arranged in said cam in relation to the means for stamping a disk from a web, flanging the disk and inserting the same into the receptacle body in a holder positioned relative to said means to permit of yielding expanding movement of the holder sections to compensate for variations in the size of the flanged disk and expansion of the receptacle body.

21. Apparatus for applying closures to receptacle bodies as claimed in claim 17, wherein the means to maintain the holder sections in closed position comprises a cam juxtaposed to the holder carrier with which cam followers operatively connected to the holder sections co-operate, and means arranged in said cam at the position of rest of the holder carrier for inserting a receptacle body into the holder to permit of yielding expansion of the holder sections to facilitate the insertion of a receptacle body and compensate for variations in the size of receptacles, said compensating means comprising an undercut portion in the cam face, headed pins engaging in and extending through openings in said portion of the cam for engagement by the cam followers, and a spring to yieldingly urge said pins in a direction to project the same beyond the cam surface.

22. Apparatus for applying closures to receptacle bodies as claimed in claim 17, wherein the means to maintain the holder sections in closed position comprises a cam juxtaposed to the holder carrier with which cam followers operatively connected to the holder sections co-operate, and means arranged in said cam in relation to the means for stamping a disk from a web, flanging the disk and inserting the same into the receptacle body in a holder positioned relative to said means to permit of yielding expanding movement of the holder sections to compensate for variations in the size of the flanged disk and expansion of the receptacle body, said compensating means comprising an insert slidably mounted in the cam surface for engagement of the cam followers, and means to normally urge said insert outward from the cam face.

23. Apparatus for applying closures to receptacle bodies as claimed in claim 11, wherein the receptacle holders comprise a pair of semi-circular sections pivotally supported on the carrier to have movement on axes extending longitudinally of the holder and adapted to assume a position with the opposite edge portions of the holder sections spread, a disk having a cam face relative to which the holders are movable, cam followers operatively connected to the holder sections and adapted to co-operate with said cam disk to maintain the holder sections in closed position, said holder sections being arranged at the entrance end with means to form an annular rib when the sections are in closed position.

24. Apparatus for applying closures to receptacle bodies as claimed in claim 11, wherein the receptacle holders comprise a pair of semi-circular sections pivotally supported on the carrier to have movement on axes extending longitudinally of the holder and adapted to assume a position with the opposite edge portions of the holder sections spread, a disk having a cam face relative to which the holders are movable, cam followers operatively connected to the holder sections and adapted to co-operate with said cam disk to maintain the holder sections in closed position, said holder sections being arranged at the ends to co-operate with the closure insetting means to form an annular seat in a receptacle body in a holder for the flanged closure disk.

25. Apparatus for applying closures to receptacle bodies as claimed in claim 17, wherein the means to lock the holder sections in closed position comprises a plate mounted on one holder section to have sliding movement longitudinally thereof and having a bifurcation at one end, and a pin fixed in and extending from each holder section with which the bifurcated end of the plate engages in one position thereof.

26. Apparatus for applying closures to receptacle bodies as claimed in claim 17, wherein the means to lock the holder sections in closed position comprises a plate mounted on one holder section to have sliding movement longitudinally thereof and having a bifurcation at one end, and a pin fixed in and extending from each holder section with which the bifurcated end of the plate engages in one position thereof, and the means for actuating said locking plate to move it to locking and unlocking position comprising fixed cams arranged in the path of movement of the receptacle holders and interposed between the closure disk forming and applying means and the means to primarily break down the contiguous portions of the closure flange and receptacle body, and between the means to upset said closure flange and receptacle body and the ejecting means, and cam followers carried by the locking plates to co-operate with said cams.

27. In apparatus for applying closures to receptacle bodies, a holder for a receptacle body, a carrier from which the holder radially projects rotatably supported to have movement on an axis transverse to the axis of the holder, a drive shaft, means operative from the drive shaft to intermittently rotate the holder carrier to successively move the same from a receptacle body receiving position to means to stamp a disk from a web, flange the disk and insert the same into the end of the receptacle in the holder, to means to upset the flange of the closure disk and contiguous portion of the body to secure the disk therein, and to position to eject the receptacle from the holder, said closure disk forming means comprising a fixed plate with an opening therethrough having two diameters, a pair of plungers arranged concentrically and axially with the plate opening and between which plungers and the plate the web is adapted to be fed, the outer of said plungers being adapted to co-operate with the portion of the plate opening of larger diameter to serve as a cutting die to stamp a disk from the web and the other plunger adapted to co-operate with the portion of the plate opening of smaller diameter to peripherally flange the disk and insert the flanged disk into a receptacle body in a holder positioned relative thereto.

28. An apparatus for applying closures to receptacle bodies as claimed in claim 27, wherein the disk stamping and flanging plungers are actuated from cams on the drive shaft.

29. In apparatus for applying closures to receptacle bodies as claimed in claim 27, cams on the drive shaft, and means including cam followers for operatively connecting the plungers to the cams to be reciprocated thereby.

30. In apparatus for applying closures to receptacle bodies as claimed in claim 27, cams on the drive shaft, cam following rollers, carriers for said rollers, and means to adjustably connect said carriers to the plungers to reciprocate the plungers.

31. Apparatus for applying closures to receptacle bodies as claimed in claim 27, means for moistening and rendering the web pliable previous to action thereon by the means to stamp a disk therefrom and flange the disk.

32. In apparatus for applying closures to receptacle bodies as claimed in claim 27, means for moistening and rendering the web pliable previous to the action thereon by the means to stamp a disk therefrom and flange the disk, and means to feed a predetermined portion of the pliably rendered web to said means to stamp a disk from the web and flange the same.

33. In apparatus for applying closures to receptacle bodies as claimed in claim 27, means for moistening and rendering the web pliable previous to the action thereon by the means to stamp a disk therefrom and flange the disk, comprising a fixed drum arranged with a slot cut through the wall and extending longitudinally of the drum, means to guide the web over the slotted portion in contiguous relation to the drum, and means within the drum for connection with a source of vapor supply for spraying vapor through the drum slot onto the web in its passage thereover.

34. In apparatus for applying closures to receptacle bodies as claimed in claim 27, means for moistening and rendering the web pliable previous to the action thereon by the means to stamp a disk therefrom and flange the disk, comprising a fixed drum arranged with a slot cut through the wall and extending longitudinally of the drum, means to guide the web over the slotted portion in contiguous relation to the drum, a pipe having one end closed mounted within the drum in parallel relation to the drum slot and having perforations opening to said slot, and adapted for connection exterior of the drum with a source of steam supply for spreading said steam through the drum slot onto the web in its passage thereover and the water of condensation of said steam adapted to be collected in and drained from the drum.

35. In apparatus for applying closures to receptacle bodies as claimed in claim 27, means for moistening and rendering the web pliable previous to the action thereon of the means to stamp a disk therefrom and flange the disk, and a pair of feed rollers to positively feed a predetermined portion of the pliably rendered web to said means to stamp a disk from the web and flange the same.

36. In apparatus for applying closures to receptacle bodies, a holder for a receptacle body, a rotatable carrier upon which the holder is mounted to extend radially therefrom, a drive shaft, and means operative from the drive shaft to intermittently rotate the carrier to advance the holder from position to receive a receptacle body to means to stamp a disk from a web, flange the disk and apply the same to the end of the receptacle, to means to primarily break down the disk flange and contiguous receptacle portion, to means to roll the contiguous disk flange and receptacle portion together to secure the disk in the receptacle, and then to position to eject the receptacle from the holder, said means to primarily break down and roll together the disk flange and contiguous body portion comprising a pair of continuously rotating spinning heads and movable axially toward and away from a receptacle holder positioned relative thereto.

37. Apparatus for applying closures to receptacle bodies as claimed in claim 36, wherein the spinning heads are rotated by electric motors.

38. Apparatus for applying closures to receptacle bodies as claimed in claim 36, wherein the spinning heads are mounted upon the power shaft of electric motors to rotate therewith and have axial reciprocatory movement, and means operative from the drive shaft to impart the reciprocatory movement to said spinning heads.

39. Apparatus for applying closures to receptacle bodies as claimed in claim 36, wherein the spinning heads are mounted upon the power shaft of electric motors to rotate therewith and have axial reciprocatory movement, and means operative from the driving shaft to impart the reciprocatory movement to said spinning heads, comprising a lever, a cam on the drive shaft, and means including a cam follower for operatively connecting the lever to the cam.

40. Apparatus for applying closures to receptacle bodies as claimed in claim 36, wherein the spinning heads for breaking down and rolling together the disk flange and contiguous receptacle portion comprises a block, a plate fixed to the face of the block having a circular groove in the face adjacent to the periphery thereof, recesses cut through the periphery of said plate and block arranged at diametrically opposite points and spaced ninety degrees apart, and rollers rotatably mounted on the block within the recessed portions of the plate and block having the peripheral wall arranged to conform to and positioned in relation to the groove in the plate.

41. Apparatus for applying closures to receptacle bodies as claimed in claim 36, wherein the spinning heads for breaking down and rolling together the disk flange and contiguous receptacle portion comprises a block, a plate fixed to the face of the block having a circular groove in the face adjacent to the periphery thereof, recesses cut through the periphery of said plate and block arranged at diametrically opposite points and spaced ninety degrees apart, studs mounted in the block to extend radially therefrom in alinement with the recesses in the plate and block, and rollers rotatably mounted on said studs having the peripheral wall arranged to substantially form to and positioned in relation to the groove in the plate.

42. Apparatus for applying closures to receptacle bodies as claimed in claim 36, wherein the spinning heads for breaking down and rolling together the disk flange and contiguous receptacle portion comprises a block, a plate fixed to the face of the block having a circular groove in the face adjacent to the periphery thereof, recesses cut through the periphery of said plate and block arranged at diametrically opposite points and spaced ninety degrees apart, studs mounted in the block to extend radially therefrom in alinement with the recesses in the plate and block, rollers rotatably mounted on said studs having the peripheral wall arranged to substantially form to and positioned in relation to the groove in the plate, and means to retain the rollers on the studs, comprising a pair of arms each arm being fixed intermediate its ends to lugs extending diametrically from the block in interposed relation to a pair of block recesses, the ends of each arm being arranged to extend over a roller carrying stud, thrust bearings interposed between said arms and the rollers, and set screws threaded into the arms and engaging the bearings.

Signed at the city of New York in the county of New York and State of New York this 26th day of September, 1925.

IRVING STANLEY.